United States Patent
Huijsing

(10) Patent No.: US 11,655,036 B2
(45) Date of Patent: May 23, 2023

(54) INFLATABLE HOOD FOR AIR PROTECTION

(71) Applicant: Koninklijke Fabriek Inventum B.V., Nieuwegein (NL)

(72) Inventor: Hans Huijsing, Ijsselstein (NL)

(*) Notice: Subject to any disclaimer, the term of this patent is extended or adjusted under 35 U.S.C. 154(b) by 33 days.

(21) Appl. No.: 17/339,640

(22) Filed: Jun. 4, 2021

(65) Prior Publication Data

US 2021/0380257 A1  Dec. 9, 2021

Related U.S. Application Data

(60) Provisional application No. 63/034,809, filed on Jun. 4, 2020.

(51) Int. Cl.
*B64D 11/06* (2006.01)

(52) U.S. Cl.
CPC ............... *B64D 11/0632* (2014.12)

(58) Field of Classification Search
CPC .......... B64D 11/0632; B64D 2231/025; A62B 17/04
See application file for complete search history.

(56) References Cited

U.S. PATENT DOCUMENTS

| | | | | |
|---|---|---|---|---|
| 2,850,011 A * | 9/1958 | Schaefer | ............... | A62B 18/04 128/201.28 |
| 4,559,939 A * | 12/1985 | Levine | ............... | B64D 11/0632 128/201.15 |
| 4,620,538 A * | 11/1986 | Koegel | ............. | A61M 16/0627 128/205.26 |
| 4,625,721 A * | 12/1986 | Levine | ............... | B64D 11/0629 128/201.28 |
| 4,766,893 A * | 8/1988 | Drews | .................... | A62B 17/04 128/202.14 |
| 4,832,287 A * | 5/1989 | Werjefelt | ............... | B64D 11/00 280/732 |
| 4,896,665 A * | 1/1990 | Gervais | .................. | A62B 17/04 128/205.27 |
| 6,340,024 B1 * | 1/2002 | Brookman | ............. | A62B 17/04 128/201.15 |
| 6,792,623 B2 * | 9/2004 | Luppi | ............... | A61M 16/0627 128/201.24 |
| 8,052,087 B2 * | 11/2011 | Jorn | .................... | B64D 11/0626 261/28 |

(Continued)

FOREIGN PATENT DOCUMENTS

EP  0242704 A1  10/1987
EP  1609506 A1  12/2005

(Continued)

OTHER PUBLICATIONS

Extended European search report issued in corresponding EP application No. 21177877.4, dated Oct. 15, 2021.

*Primary Examiner* — Richard G Davis

(57) ABSTRACT

A protective hood for air travel including a plurality of deformable partitions coupled to each other defining an inner cavity, wherein in a folded position the inner cavity is collapsed to a negligible size and in an unfolded position the inner cavity is configured to comfortably confine an human head, wherein one of the partitions includes a deformable opening configured to be stretched and fit over a head, and at least one coupling mechanism configured to attach one of the deformable partitions to an aircraft seat.

19 Claims, 3 Drawing Sheets

(56) References Cited

U.S. PATENT DOCUMENTS

2014/0150780 A1\*  6/2014  Steger .................... A62B 18/04
                                                    128/201.28

FOREIGN PATENT DOCUMENTS

| WO | 2005068021 A2 | 7/2005 | | |
| WO | WO-2005068021 A2 * | 7/2005 | ............... | A42B 3/28 |
| WO | 2014031671 A1 | 2/2014 | | |

\* cited by examiner

INFLATABLE HOOD FOR AIR PROTECTION

CROSS REFERENCE AND PRIORITY

This application claims priority to U.S. Provisional Application 63/034,809 filed on Jun. 4, 2020, the contents of which are wholly incorporated by reference.

BACKGROUND

Technological Field

The present disclosure relates generally to a breathing hood, specifically to be used on an aircraft to protect against pathogen spread.

Description of Related Art

The COVID-19 pandemic showed us that pathogens can spread easily with the global travel. For that reason, it has become vital to minimize contamination and pathogen spread between passengers during flights. It is foreseeable that at some point happen that there may be a passenger on board an aircraft that is suspected of carrying COVID-19 or another virus. Right now, there are no ways to isolate the passenger, except for locking them in a lavatory, which can be cruel and inhumane. There is a clear need in the art for isolating sick passengers from healthy ones. The present disclosure provides a solution for this need.

SUMMARY OF THE INVENTION

A protective hood that can be stored inside an aircraft galley for air travel includes a plurality of deformable partitions coupled to each other defining an inner cavity, wherein in a folded position the inner cavity is collapsed to a negligent size and in an unfolded position the inner cavity is configured to comfortably confine an human head, and at least one coupling mechanism configured to attach one of the deformable partitions to an aircraft seat, wherein a bottom deformable partition includes an opening that is configured to attach to a user's neck or torso.

At least one of the side partitions can include a port configured to accept a drinking straw there through. At least one of the partitions can include an air-port configured to accept an oxygen tube, which can be attached to an oxygen tank.

At least one of the partitions can be transparent in order for the user to be able to see through the partition and for the crew to be able to monitor the patient or passenger. At least one of the partitions can include a breathing sensor is coupled physically or wirelessly to an alarm to alert a crew member of a sudden change in breathing characteristics.

At least one of the partitions can include a flap to access the inner cavity. The flap can be spaced apart from the inner cavity by an inner flap with a secondary cavity located between the flap and the inner flap. The flap can be coupled to the at least one partition by a magnetic strip, a hook and loop coupling, pins, or any other capable fastener.

At least one of the partitions can include a pair passageways directed into the inner cavity in order to give users outside the hood hand access to the inner cavity in order to check on a passenger without touching him, or for the passenger to be able to touch his face without having to take the protective hood off. Each of the pair or passageways positioned in opposing partitions can extend a third of a length of the inner cavity when in the unfolded position.

The hood can have a generally rectangular shape wherein at least a pair of partitions form 90 degree angled to each other in the unfolded position. At least one edge of the at least one of the partitions can define an acute angle to at least another partition, wherein the edge is meant to be placed against a seat-back of the passenger's seat. The at least one edge includes a hook and loop coupling, so that it attaches to the seat and is kept in place. The at least one edge includes at least one kink or bend so that it adheres best to a non-straight seatback.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
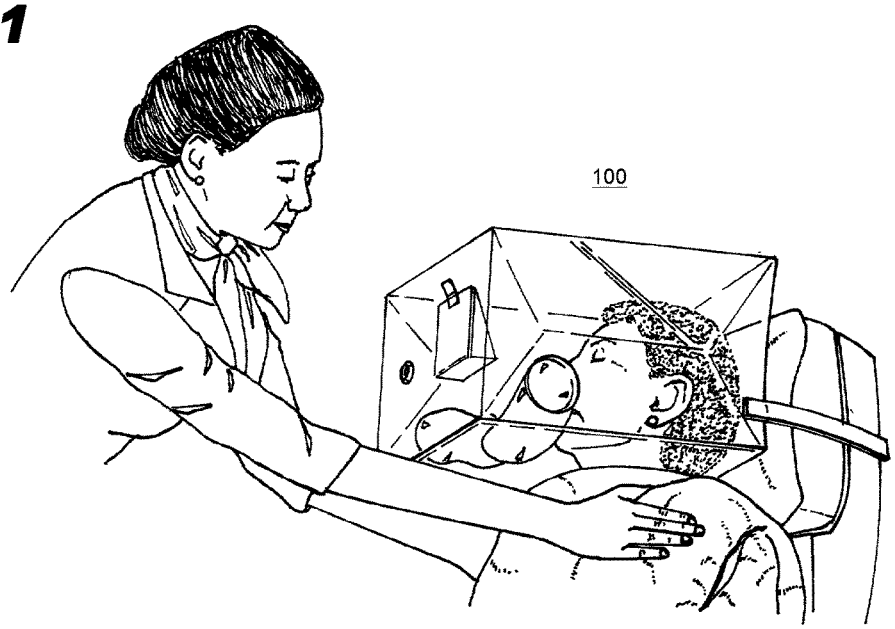
FIG. 1 is a perspective view of an exemplary embodiment a protective hood in situ.
Figure 2:
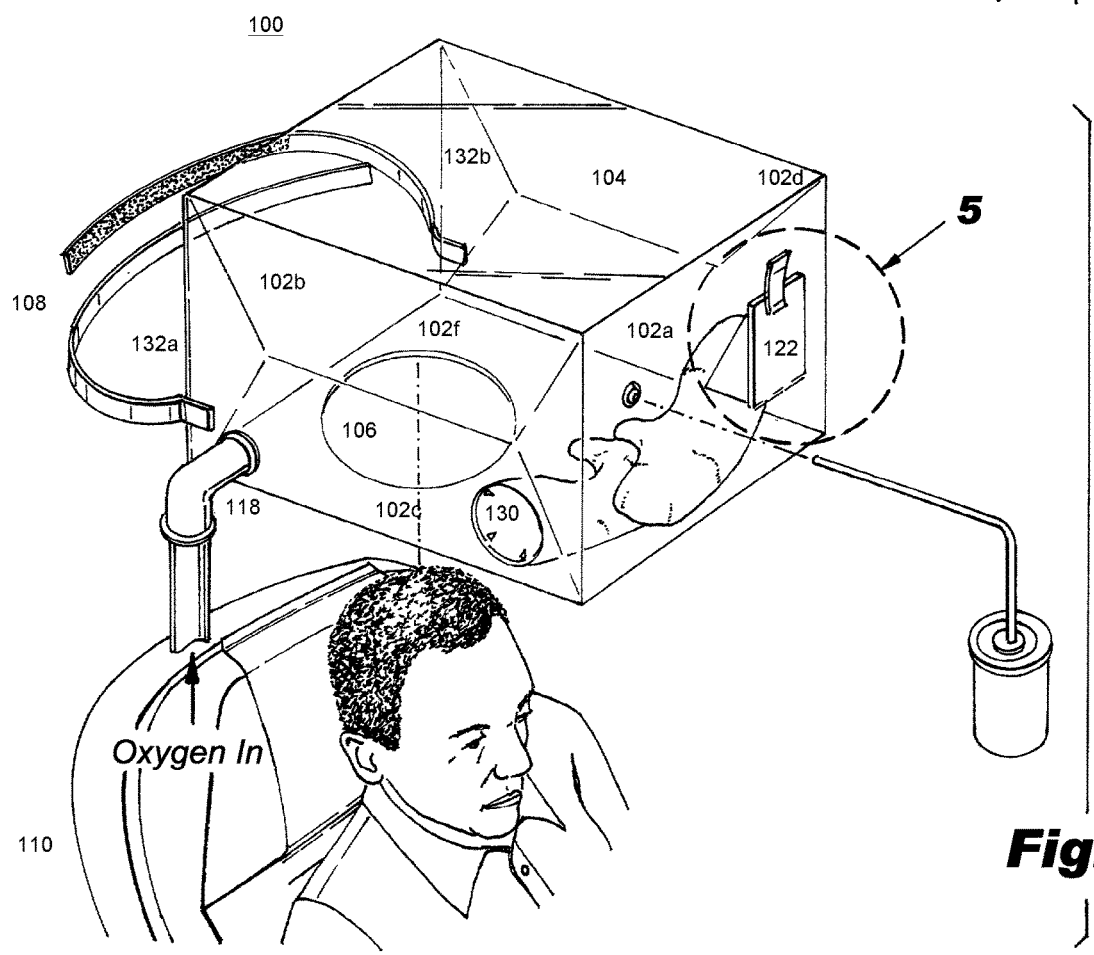
FIG. 2 is perspective exploded view of an exemplary embodiment of the protective hood of FIG. 1 in an unfolded position removed from the passenger.

Reference will now be made to the drawings wherein like reference numerals identify similar structural features or aspects of the subject disclosure. For purposes of explanation and illustration, and not limitation, a partial view of an exemplary embodiment of an inflatable hood is shown in FIG. 1 and is designated generally by reference character 100. Other embodiments of the hood in accordance with the disclosure, or aspects thereof, are provided in FIGS. 2-6, as will be described. The hood can be used to isolate a sick passenger from the rest of the passengers in flight while also keeping the potentially sick passenger comfortable in their seat.

Referring now to FIGS. 1-6, a protective transparent hood 100 for use during air travel, is shown. The transparent hood 100, which allows the crew to monitor the passenger and allows the passenger to interact easily, can be stored inside an aircraft galley or overhead compartment, includes a plurality of deformable partitions 102*a-f* coupled to each other defining an inner cavity 104. The inner cavity 104 is dimensioned such that an adult human would be comfortable within the hood 100. The hood 100 is worn overhead by placing the head through the bottom opening 106 located within the bottom partition 102*f*. The bottom opening 106 includes an elastic material which is stretched to fit over a user's face and head and then shrinks backs down to size to comfortably rest on a person's shoulders or neck area. When worn, the hood 100 can also be held in place by a coupling mechanism 108 such as strap, or a hook and loop combination, to attach it better to a seat back 110.

The front partition 102a includes a drinking straw port 112. The straw port 112 includes an opening 114 on the outside and a straw 116 on the inside so that a steward or passenger can plug in a straw which can the passenger can drink from. The front partition 102a further includes an outer flap 122 to access the inner cavity 104. The flap 122 allows access to a small secondary cavity 124 (shown in detail in FIG. 5). The secondary cavity 124 includes a small tray 126 so that small food items or thermometers can be placed there and used by the passenger. An inner flap 128 can further separate the secondary cavity 124 from the inner cavity 104. The flaps 122/128 can be coupled to the respective partitions by a magnetic strip, a hook and loop coupling, pins, or any other capable fastener 129.

The back partition 102b includes an air-port 118 to accept an oxygen tube, which is be attached to an oxygen tank at the second end. One of the partitions can include a breathing sensor on the inner cavity 104 side which is coupled physically or wirelessly to an alarm to alert a crew member of a sudden change in breathing characteristics of the passenger. The sensor can monitor oxygen levels and carbon dioxide levels, and the changes in each of them.

Each of the side partitions 102c and 102d include a glove or mitten like passageway 130 directed into the inner cavity 104 which give users outside the hood 100 access to the inner cavity 104 in order to check on the passenger without touching him, or for the passenger to be able to touch their face without having to remove the hood 100. Each of the pair of passageways 130 extend third of a length of the inner cavity 104.

The hood 100 has a generally rectangular shape where the partitions form 90 degree angles to each other in the unfolded position. The rear edges 132a and 132b meant to be placed against a seat-back of the passenger's seat for acute angle with respect to the top partition 102e. The rear edges 132a and 132b include at least one kink 134 or bend so that it adheres flush against to a non-straight seatback, shown in FIG. 4.

Figure 3:
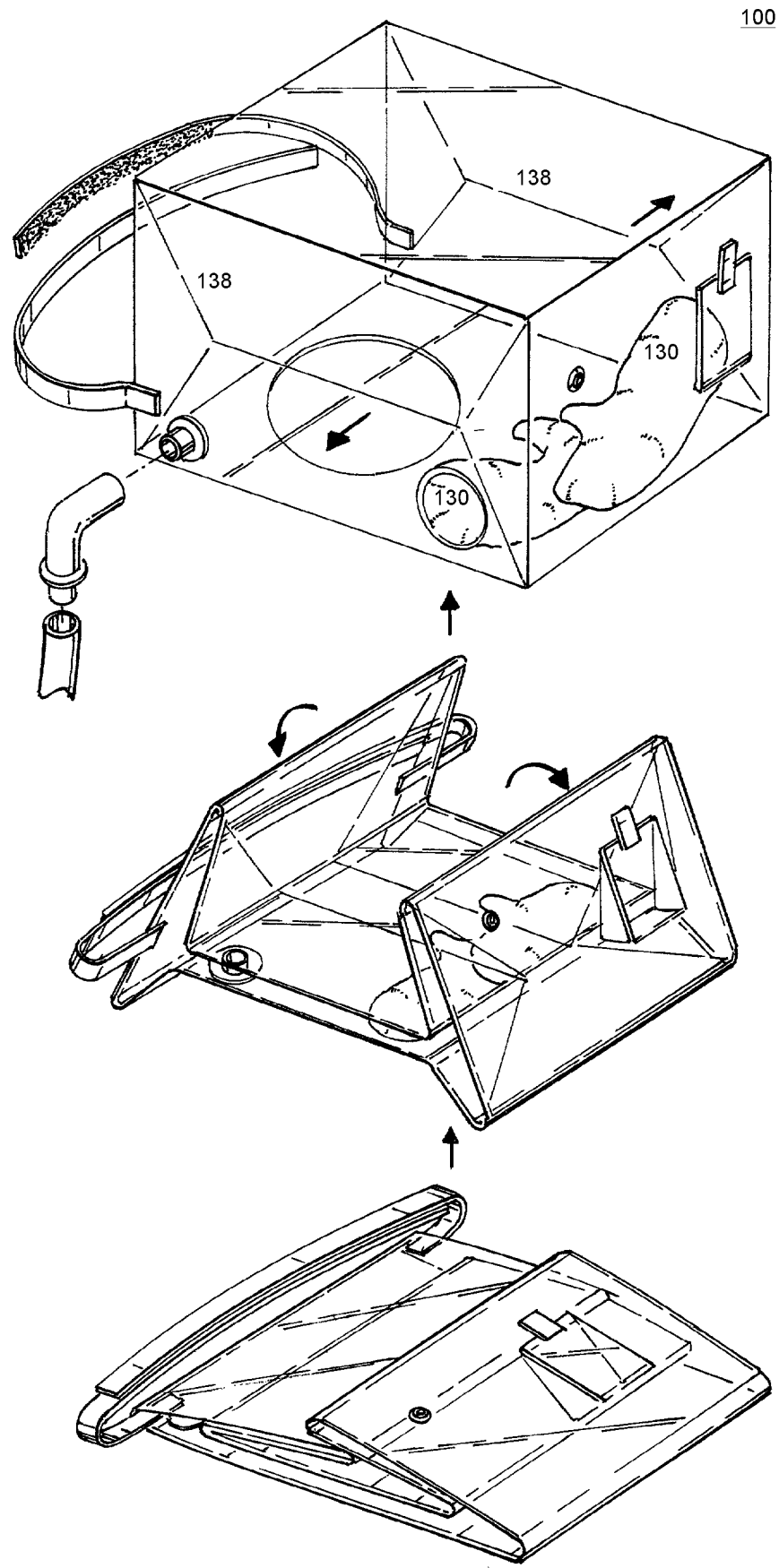
FIG. 3 is an unfolding sequence of the exemplary embodiment of the protective hood of FIG. 1.
Figure 4:
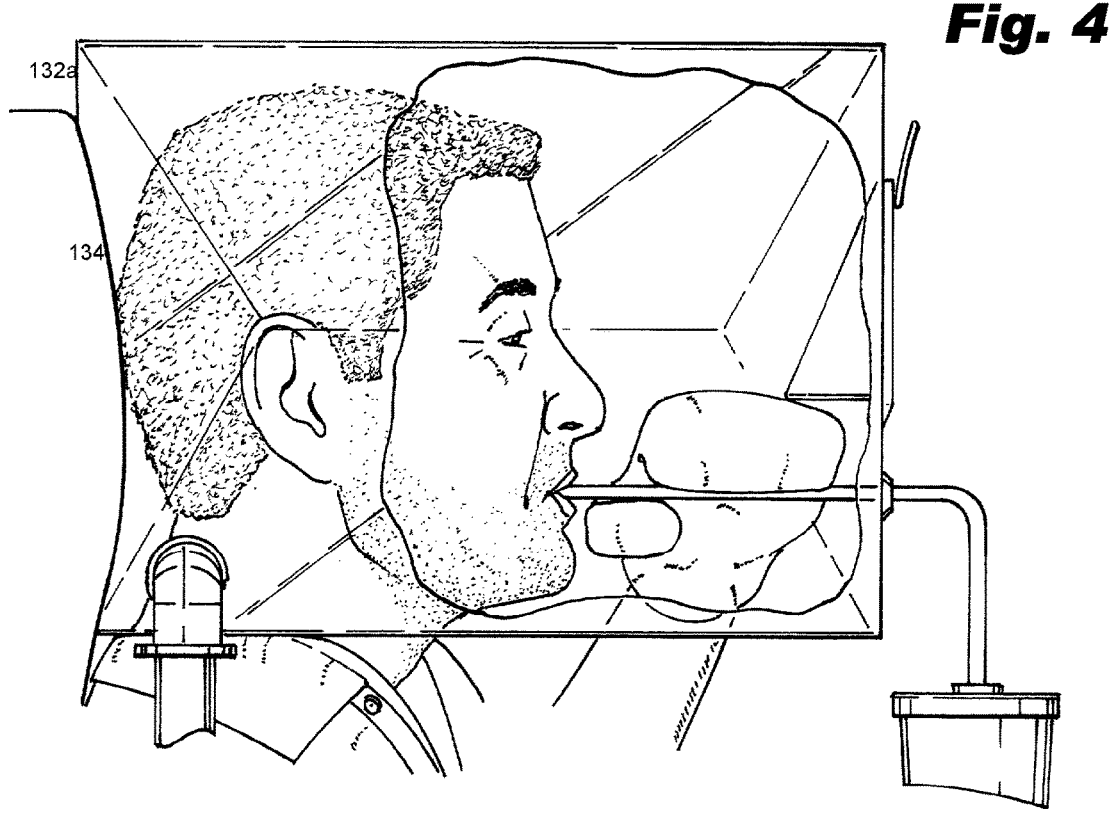
FIG. 4 is a side view of the exemplary embodiment of the protective hood of FIG. 1.
Figure 5:
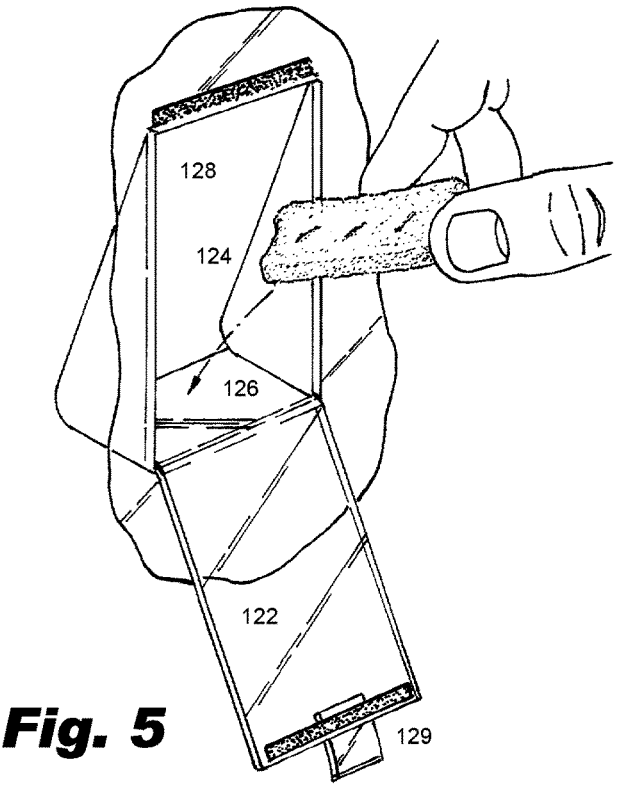
FIG. 5 is an enlarged view of an inner compartment of the protective hood of FIG. 1.
Figure 6:
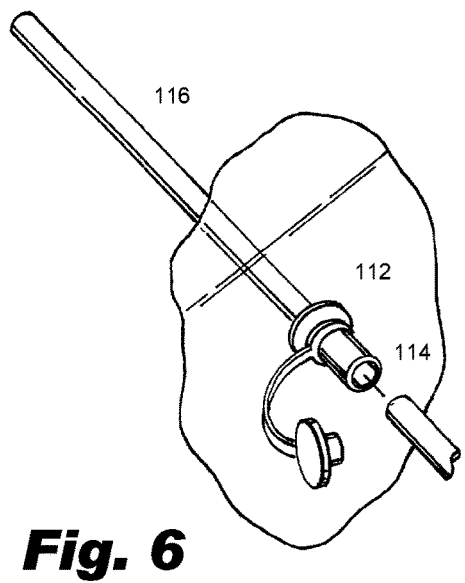
FIG. 6 is an enlarged view of a straw port of the protective hood of FIG. 1.

FIG. 3 shows the hood 100 in being unfolded from a folded, so that it can be easily stowed in a galley compartment or in overhead bin. The partitions 102a-f fold inward and the hood becomes a rectangular shape. Gussets 138 allow the partitions 102a-f to fold inward and collapse on itself.

The systems of the present disclosure, as described above and shown in the drawings, provide for an improved hood that provides protection to passengers within an aircraft from pathogen spread while keeping the potentially ill passenger comfortable and visible to the crew. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A protective hood for air travel comprising:
   a plurality of deformable partitions coupled to each other defining an inner cavity, wherein in a folded position the inner cavity is collapsed to a size smaller than an unfolded position and in the unfolded position the inner cavity is configured to accommodate a human head, wherein one of the partitions includes a deformable opening configured to be stretched and fit over a head; and
   at least one coupling mechanism configured to attach one of the deformable partitions to an aircraft seat, wherein at least one of the partitions includes a breathing sensor.

2. The hood of claim 1, wherein at least one of the partitions includes a port configured to accept a drinking straw there through.

3. The hood of claim 1, wherein at least one of the partitions is transparent.

4. The hood of claim 1, wherein the breathing sensor is coupled to an alarm configured to alert a crew member of a sudden change in breathing characteristics.

5. The hood of claim 1, wherein at least one of the partitions includes an air-port configured to accept an oxygen tube.

6. The hood of claim 5, wherein the oxygen tube is configured to couple to an oxygen tank.

7. The hood of claim 1, wherein at least one of the partitions includes a flap to access the inner cavity.

8. The hood of claim 1, wherein at least a pair of partitions form 90 degree angled to each other in the unfolded position.

9. The hood of claim 1, wherein at least one edge of at least one of the partitions defines a acute angle to at least a second partition.

10. The hood of claim 9, wherein the at least one edge includes a hook and loop coupling.

11. The hood of claim 9, wherein the at least one edge includes at least one kink or bend.

12. The hood of claim 1, wherein at least a portion of the tent is disposable.

13. The hood of claim 1, further comprising a storage container configured to be stored within a galley of an aircraft;
   at least one coupling mechanism configured to attach one of the deformable partitions to an aircraft seat, wherein at least one of the partitions includes a flap to access the inner cavity, wherein at least one of the partitions includes a pair of passageways directed to the inner cavity configured to give users outside the tent hand access to the inner cavity.

14. A protective hood for air travel comprising:
   a plurality of deformable partitions coupled to each other defining an inner cavity, wherein in a folded position the inner cavity is collapsed to a size smaller than an unfolded position and in the unfolded position the inner cavity is configured to accommodate a human head, wherein one of the partitions includes a deformable opening configured to be stretched and fit over a head; and
   at least one coupling mechanism configured to attach one of the deformable partitions to an aircraft seat, wherein at least one of the partitions includes a flap to access the inner cavity, wherein the flap is spaced apart from the inner cavity by an inner flap.

15. The hood of claim 14, wherein a secondary cavity is located between the flap and the inner flap.

16. A protective hood for air travel comprising:
   a plurality of deformable partitions coupled to each other defining an inner cavity, wherein in a folded position the inner cavity is collapsed to a size smaller than an unfolded position and in the unfolded position the inner cavity is configured to accommodate a human head, wherein one of the partitions includes a deformable opening configured to be stretched and fit over a head; and at least one coupling mechanism configured to attach one of the deformable partitions to an aircraft seat, wherein at least one of the partitions includes a flap to access the inner cavity, wherein the flap is coupled to the at least one partition by a magnetic strip, a hook and loop, or a pin.

17. A protective hood for air travel comprising:

a plurality of deformable partitions coupled to each other defining an inner cavity, wherein in a folded position the inner cavity is collapsed to a size smaller than an unfolded position and in the unfolded position the inner cavity is configured to accommodate a human head, wherein one of the partitions includes a deformable opening configured to be stretched and fit over a head; and at least one coupling mechanism configured to attach one of the deformable partitions to an aircraft seat, wherein at least one of the partitions includes a flap to access the inner cavity, wherein at least one of the partitions includes a pair of passageways directed to the inner cavity configured to give users outside the tent hand access to the inner cavity.

18. The hood of claim 17, wherein each of the pair of passageways extends a third of a length of the inner cavity when in the unfolded position.

19. The hood of claim 17, wherein each of the passageways are in opposing partitions.

* * * * *

UNITED STATES PATENT AND TRADEMARK OFFICE
CERTIFICATE OF CORRECTION

| | | |
|---|---|---|
| PATENT NO. | : 11,655,036 B2 | Page 1 of 1 |
| APPLICATION NO. | : 17/339640 | |
| DATED | : May 23, 2023 | |
| INVENTOR(S) | : Hans Huijsing | |

It is certified that error appears in the above-identified patent and that said Letters Patent is hereby corrected as shown below:

On the Title Page

Item (73) Assignee, insert -- B/E AEROSPACE, INC., Winston Salem, North Carolina --

Signed and Sealed this
Fifth Day of November, 2024

Katherine Kelly Vidal
*Director of the United States Patent and Trademark Office*